(12) United States Patent
Sil et al.

(10) Patent No.: US 8,982,666 B2
(45) Date of Patent: Mar. 17, 2015

(54) METHODS FOR SEISMIC FRACTURE PARAMETER ESTIMATION AND GAS FILLED FRACTURE IDENTIFICATION FROM VERTICAL WELL LOG DATA

(75) Inventors: Samik Sil, Houston, TX (US); Robert G. Keys, Houston, TX (US); Baishali Roy, Katy, TX (US); Douglas J. Foster, Houston, TX (US)

(73) Assignee: ConocoPhillips Company, Houston, TX (US)

( * ) Notice: Subject to any disclaimer, the term of this patent is extended or adjusted under 35 U.S.C. 154(b) by 544 days.

(21) Appl. No.: 13/430,190

(22) Filed: Mar. 26, 2012

(65) Prior Publication Data

US 2012/0250459 A1    Oct. 4, 2012

Related U.S. Application Data

(60) Provisional application No. 61/468,110, filed on Mar. 28, 2011.

(51) Int. Cl.
*G01V 1/50* (2006.01)
*G01V 1/20* (2006.01)
(Continued)

(52) U.S. Cl.
CPC .. *G01V 1/50* (2013.01); *G01V 1/20* (2013.01); *G01V 1/40* (2013.01); *G01V 2210/16* (2013.01);
(Continued)

(58) Field of Classification Search
CPC ............. G01V 1/50; G01V 1/40; G01V 1/20; G01V 2210/586; G01V 2210/16; G01V 2210/626; G01V 2210/647; G01V 2210/646; G01V 1/282
See application file for complete search history.

(56) References Cited

U.S. PATENT DOCUMENTS 6,904,368 B2 * 6/2005 Reshef et al. .................... 702/17
7,355,923 B2 * 4/2008 Reshef et al. .................... 367/53
(Continued)

OTHER PUBLICATIONS

Linear elasticity. (Nov. 6, 2014). In Wikipedia, The Free Encyclopedia. Retrieved 22:45, Nov. 16, 2014, from http://en.wikipedia.org/w/index.php?title=Linear_elasticity&oldid=632728878.*

(Continued)

*Primary Examiner* — Ari M Diacou
(74) *Attorney, Agent, or Firm* — ConocoPhillips Company

(57) ABSTRACT

Methods for fracture characterization of unconventional formations are provided. Synthetic seismic fracture responses can be generated based on the derived fracture parameters. The synthetic seismic fracture responses may then be used to derive optimum seismic data acquisition geometry for fracture characterization. These methods of determining the seismic data acquisition geometry are advantageous over conventional methods in that these methods are more reliable and cheaper than existing empirical methods, particularly as applied to fractured unconventional formations. Moreover, these methods allow fracture parameters to be derived from limited but common well log data. Certain embodiments additionally contemplate determining the presence of gas filled fractures. These characterizations and evaluations of unconventional formations are useful for, among other things, determining optimal producing intervals and optimal drilling locations. These methods can eliminate the use of costly image logs and core data. These methods ultimately translate to more efficient seismic imaging and more optimal hydrocarbon production.

22 Claims, 8 Drawing Sheets

(51) Int. Cl.
*G01V 1/40* (2006.01)
*G01V 1/28* (2006.01)

(52) U.S. Cl.
CPC ........... *G01V 2210/586* (2013.01); *G01V 1/282* (2013.01); *G01V 2210/626* (2013.01); *G01V 2210/646* (2013.01); *G01V 2210/647* (2013.01)
USPC ................... 367/58; 367/33; 367/73; 702/11; 702/18

(56) References Cited

U.S. PATENT DOCUMENTS

| | | | |
|---|---|---|---|
| 8,407,007 B2 * | 3/2013 | Blias | 702/11 |
| 8,792,303 B2 * | 7/2014 | Downton et al. | 367/74 |
| 2002/0183980 A1 * | 12/2002 | Guillaume | 702/189 |
| 2004/0257911 A1 * | 12/2004 | Tang et al. | 367/81 |
| 2005/0090986 A1 * | 4/2005 | Van Riel et al. | 702/6 |
| 2006/0087919 A1 * | 4/2006 | Dewhurst et al. | 367/73 |
| 2007/0280048 A1 * | 12/2007 | Dubinsky et al. | 367/31 |
| 2008/0178668 A1 * | 7/2008 | Yan et al. | 73/152.02 |
| 2008/0298174 A1 * | 12/2008 | Tang et al. | 367/27 |
| 2010/0128562 A1 * | 5/2010 | Blias | 367/35 |
| 2010/0326669 A1 * | 12/2010 | Zhu et al. | 166/369 |
| 2011/0222370 A1 * | 9/2011 | Downton et al. | 367/73 |
| 2012/0051178 A1 * | 3/2012 | Zhang et al. | 367/50 |
| 2012/0215501 A1 * | 8/2012 | Vinje et al. | 703/2 |
| 2014/0336940 A1 * | 11/2014 | Bettinelli et al. | 702/14 |

OTHER PUBLICATIONS

Seismic anisotropy. (Jun. 18, 2014). In Wikipedia, The Free Encyclopedia. Retrieved 22:46, Nov. 16, 2014, from http://en.wikipedia.org/w/index.php?title=Seismic_anisotropy&oldid=613472327.*

Transverse isotropy. (Nov. 11, 2014). In Wikipedia, The Free Encyclopedia. Retrieved 22:48, Nov. 16, 2014, from http://en.wikipedia.org/w/index.php?title=Transverse_isotropy&oldid=633316986.*

"Weak elastic anisotropy," by L. Thomsen (Geophysics, 52, 1954-1966, Oct. 1986). Geophysics, 53(4), 558-559.*

Tsvankin, I., 1997, Anisotropic parameters and P-wave velocity for orthorhombic media: Geophysics, 62, 1292-1309.*

* cited by examiner

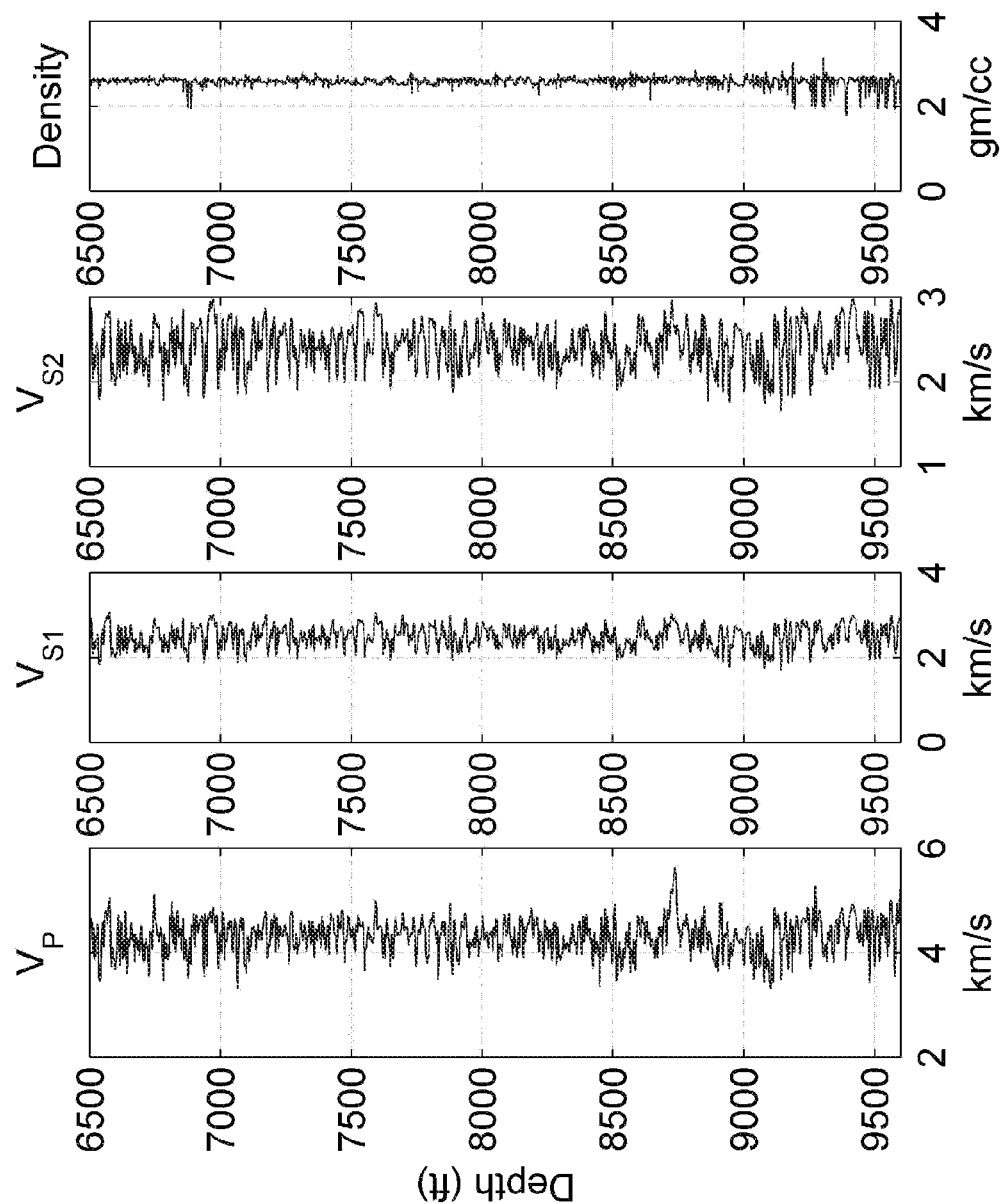

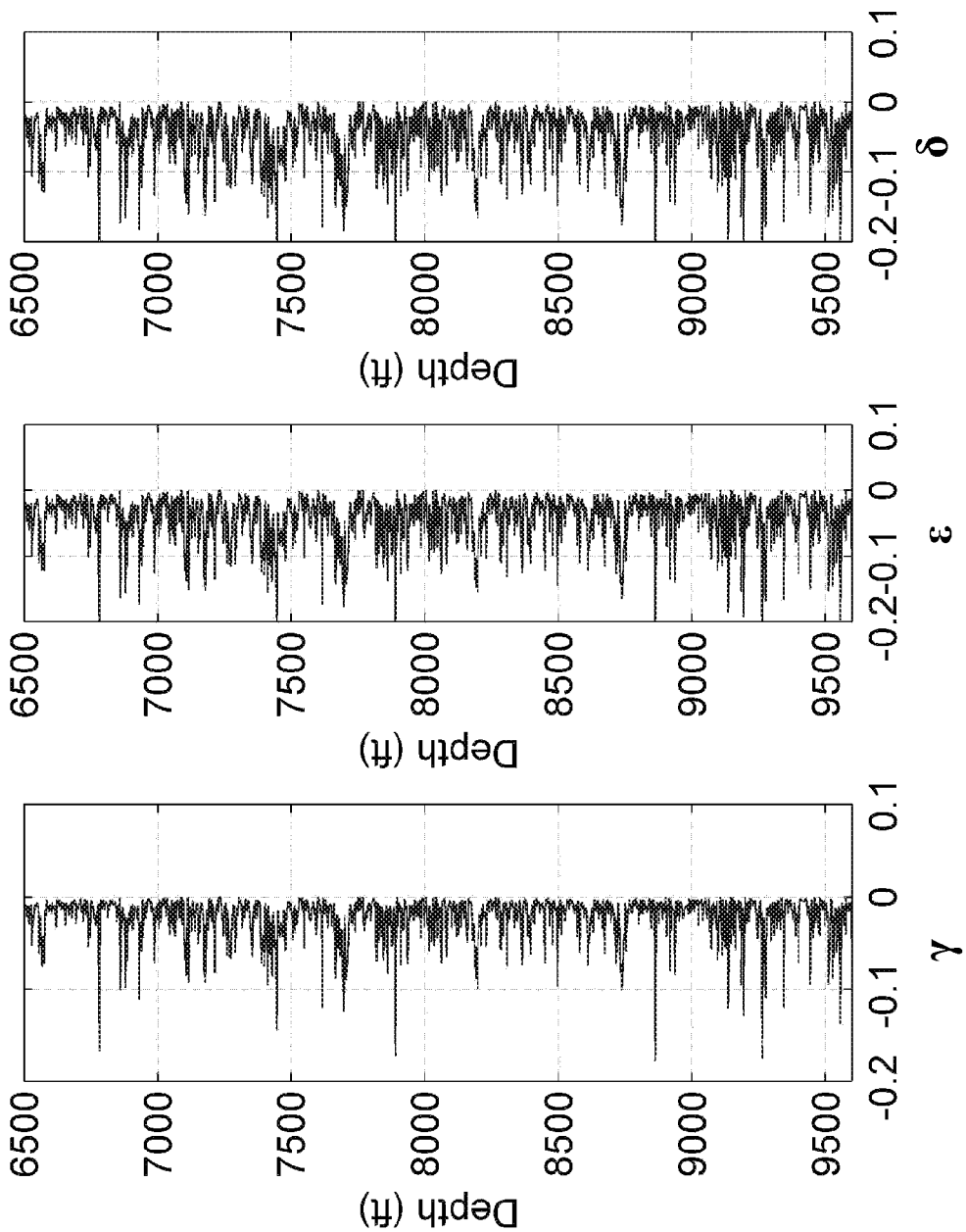

METHODS FOR SEISMIC FRACTURE PARAMETER ESTIMATION AND GAS FILLED FRACTURE IDENTIFICATION FROM VERTICAL WELL LOG DATA

CROSS-REFERENCE TO RELATED APPLICATIONS

This application is a non-provisional application which claims the benefit of and priority to U.S. Provisional Application Ser. No. 61/468,110 filed Mar. 28, 2011, entitled "Methods for Seismic Fracture Parameter Estimation and Gas Filled Fracture Identification from Vertical Well Log Data," which is hereby incorporated by reference in its entirety.

FIELD OF THE INVENTION

The present invention relates generally to methods and systems for fracture characterization of unconventional formations. More particularly, but not by way of limitation, embodiments of the present invention include methods and systems for fracture characterization of unconventional formations based on limited vertical well log data.

BACKGROUND

Unconventional reservoirs are reservoirs that do not meet the criteria for conventional production, that is, oil and gas reservoirs whose porosity, permeability, fluid trapping mechanism, or other characteristics differ from conventional reservoirs such as highly porous and permeable sandstone and carbonate reservoirs. Examples of unconventional reservoirs include coalbed methane, gas hydrates, shale gas, fractured reservoirs, and tight gas sands. Unconventional reservoirs such as tight gas sands reservoirs are defined as sandstone formations with less than about 0.1 millidarcy permeability and low porosity. Production from tight gas sands or shale reservoirs depends on the presence of natural fractures in the reservoir. Those fractured areas in the unconventional reservoir may act as sweet spot for production purposes. It has been estimated that the total-gas-in-place in the United States may exceed 15,000 trillion cubic feet where unconventional reservoir may contain majority of it.

In the exploration of oil and gas, it is often desirable to characterize the hydrocarbon content of prospective formations. While unconventional reservoirs may be continuous and therefore completely charged with gas, it is not to say that a well drilled anywhere in the reservoir will be as good a well as one drilled somewhere else. Accordingly, there are sweet spots associated with natural fractures where greater production may be realized. Finding the sweet spots is vital to drilling wells that will be economically producible.

In addition to finding the best production spots of unconventional reservoirs, determining optimal seismic data acquisition geometry for reservoir characterization is also useful and advantageous.

Unfortunately, conventional methods for characterizing fractures in unconventional reservoirs suffer from a variety of disadvantages. Conventional methods for characterizing fractured reservoirs include image logs, empirical methods, gravity and magnetic surveys as well as specialized wire line logs, core sampling, and seismic surveys.

While core sampling can provide the most detailed and high resolution information about a formation's petrophysical properties, unfortunately, taking core samples is a time-consuming, laborious, and costly process, fraught with numerous technical complications and pitfalls. Additionally, core samples often require intensive laboratory analysis and hence, high costs and delays. Often, taking a full core sample of a wellbore is simply not feasible, particularly for deep and highly deviated wells. Furthermore, core samples are extremely difficult to recover and accurately measure in a laboratory setting as the core samples must be kept at reservoir conditions to preserve their state for analysis.

Sampling while drilling is another common technique to ascertain petrophysical properties of a formation. This method can be classified as a cruder form of core analysis. Therefore, this conventional method suffers from significant limitations, particularly with respect to the amount of samples that may be taken while drilling. Furthermore, analysis of these samples is time-consuming and laborious as well.

Another common form of evaluating petrophysical properties of formations is logging. Logging tools provide a variety of noninvasive evaluation techniques for evaluating formations and detecting hydrate presence. Unfortunately, conventional logging tools only provide limited information about a formation's petrophysical properties. Individual logging techniques often fail to accurately detect and accurately evaluate the nature and composition of subterranean formations and the hydrocarbon contained therein.

Other conventional approaches for characterizing fractured formations such as image logs also suffer from a variety of disadvantages. Image logs, when available, are usually only run for a limited portion of the wellbore length. In particular, image logs are limited to the direct well bore region and only yield fracture count information. In this way, image logs fail to yield desired information to sufficiently characterize the formation. Further, image logs are difficult to correlate with seismic surveys due to different resolution limits. Also, image logs are not a cost effective solution at present day gas prices.

Cross dipole sonic logs are yet another way of characterizing fractured formations. Dipole sonic logs return S-wave velocity anisotropy due to the presence of vertical fractures. The observed S-wave anisotropy must then be converted to P-wave anisotropy for fracture reservoir characterizations. Unfortunately, S-wave to P-wave anisotropy parameter conversion is generally done using empirical relationships which are not always accurate and may return erroneous values.

All the above methods evaluate the reservoir at sparse locations, hence lack spatial resolution; whereas seismic surveys can help to evaluate the entire reservoir from the subsurface. A significant problem with seismic methods rests in its low depth resolution. Therefore, well-ties are required to get better depth resolutions for reservoir characterization from seismic data. For fractured reservoirs, cross-dipole sonic logs give S-wave anisotropy, but conventionally acquired seismic data consist of P-waves. Therefore, to perform well-ties for fracture characterization, empirically obtained P-wave anisotropy data is the only source. Since P-wave anisotropy parameters are empirically obtained, well-ties often return erroneous estimates for further fracture characterization. This problem can be solved by acquiring S-wave data, which is not common due to its high cost and difficult acquisition process.

Accordingly, there is a need for enhanced fracture characterization methods of unconventional reservoirs that address one or more of the disadvantages of the prior art.

SUMMARY

The present invention relates generally to methods and systems for fracture characterization of unconventional formations. More particularly, but not by way of limitation, embodiments of the present invention include methods and systems for fracture characterization of unconventional formations based on limited vertical well log data.

One example of a method for fracture characterization in unconventional formations comprises the steps of: logging a well at a plurality of wellbore depths to obtain a plurality of well logs, the plurality of well logs comprising a vertical P-wave velocity log, a vertical fast S-wave velocity log, a vertical slow S-wave velocity log, and a density log; wherein the vertical P-wave velocity log comprises a plurality of vertical P-wave velocities ($V_P$) at the plurality of wellbore depths; wherein the vertical fast S-wave velocity log comprises a plurality of vertical fast S-wave velocities ($V_{S1}$) at the plurality of wellbore depths; wherein the vertical slow S-wave velocity log comprises a plurality of vertical slow S-wave velocities ($V_{S2}$) at the plurality of wellbore depths; wherein the density log comprises a plurality of densities ($\rho$) at the plurality of wellbore depths; determining a plurality of seismic fracture parameters at the plurality of wellbore depths based on the plurality of well logs, the seismic fracture parameters comprising an S-wave anisotropy ($\gamma$), a P-wave anisotropy ($\epsilon$), and a move-out anisotropy ($\delta$); wherein C is a stiffness matrix, and wherein $C_{ij}$ is an element from row i and column j of the stiffness matrix; wherein the S-wave anisotropy ($\gamma_i$) is determined at each well bore depth (i) according to the relationship $$\lambda_i = \frac{V_{S2,i}^2 - V_{S1,i}^2}{2 V_{S1,i}^2}$$

or mathematical equivalent thereof; wherein the P-wave anisotropy ($\epsilon_i$) is determined at each well bore depth (i) according to the relationship $$\varepsilon_i = \frac{C_{11,i} - C_{33,i}}{2 C_{33,i}}$$

or mathematical equivalent thereof; wherein the move-out anisotropy ($\delta_i$) is determined at each well bore depth (i) according to the relationship $$\delta_i = \frac{(C_{13,i} + C_{55,i})^2 - (C_{33,i} + C_{55,i})^2}{2 C_{33,i} (C_{33,i} - C_{55,i})}$$

or mathematical equivalent thereof; generating synthetic seismic fracture responses based on the seismic fracture parameters; and deriving a seismic data acquisition geometry based on the synthetic seismic fracture responses.

One example of a method for fracture characterization in unconventional formations comprises the steps of: receiving a plurality of vertical P-wave velocities ($V_P$) at the plurality of wellbore depths; receiving a plurality of vertical fast S-wave velocities ($V_{S1}$) at the plurality of wellbore depths; receiving a plurality of vertical slow S-wave velocities ($V_{S2}$) at the plurality of wellbore depths; receiving a plurality of densities ($\rho$) at the plurality of wellbore depths; determining a plurality of seismic fracture parameters at the plurality of wellbore depths based on the plurality of well logs, the seismic fracture parameters comprising an S-wave anisotropy ($\gamma$), a P-wave anisotropy ($\epsilon$), and a move-out anisotropy ($\delta$); wherein C is a stiffness matrix, and wherein $C_{ij}$ is an element from row i and column j of the stiffness matrix; wherein the S-wave anisotropy ($\gamma_i$) is determined at each well bore depth (i) according to the relationship $$\lambda_i = \frac{V_{S2,i}^2 - V_{S1,i}^2}{2 V_{S1,i}^2}$$

or mathematical equivalent thereof; wherein the P-wave anisotropy ($\epsilon_i$) is determined at each well bore depth (i) according to the relationship $$\varepsilon_i = \frac{C_{11,i} - C_{33,i}}{2 C_{33,i}}$$

or mathematical equivalent thereof; wherein the move-out anisotropy ($\delta_i$) is determined at each well bore depth (i) according to the relationship $$\delta_i = \frac{(C_{13,i} + C_{55,i})^2 - (C_{33,i} + C_{55,i})^2}{2 C_{33,i} (C_{33,i} - C_{55,i})}$$

or mathematical equivalent thereof; generating synthetic seismic fracture responses based on the seismic fracture parameters; deriving a seismic data acquisition geometry based on the synthetic seismic fracture responses; and arranging physically a plurality of seismic receivers and at least one seismic source based on the seismic data acquisition geometry.

The features and advantages of the present invention will be apparent to those skilled in the art. While numerous changes may be made by those skilled in the art, such changes are within the spirit of the invention.

BRIEF DESCRIPTION OF THE DRAWINGS

A more complete understanding of the present disclosure and advantages thereof may be acquired by referring to the following description taken in conjunction with the accompanying figures, wherein:

FIGS. 2A, 2B, 2C, and 2D illustrate experimental log data used to generate Thomsen parameters in accordance with one embodiment of the present invention.

FIGS. 3A, 3B, and 3C illustrate graphs of Thomsen parameters estimated in accordance with the methods herein using the log data shown in FIG. 2.

FIG. 8A illustrates a production log (gas and water production flux) at the reservoir depth, whereas FIG. 8B illustrates water saturation values at the identified gas filled fracture locations.

Figure 1:
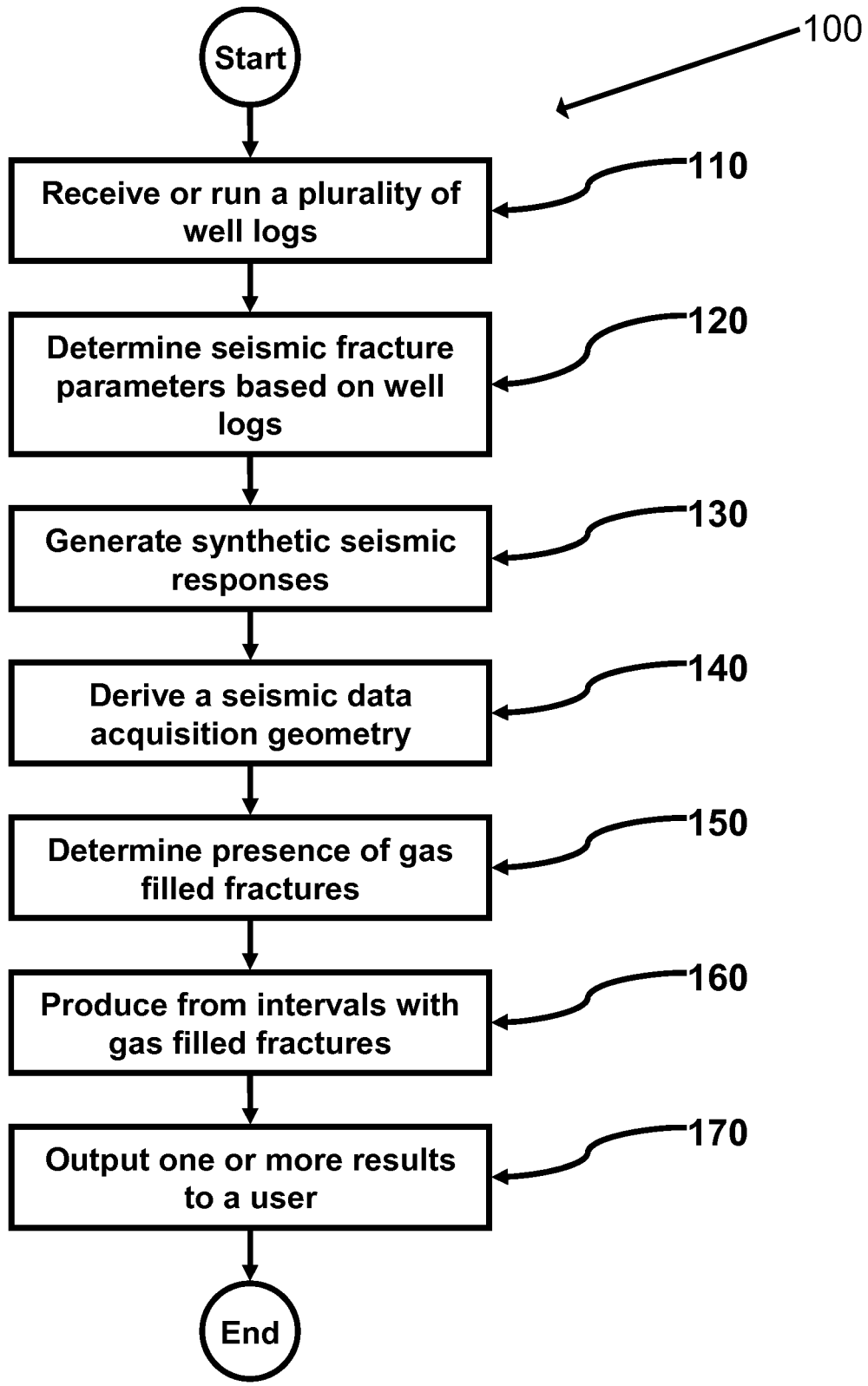
FIG. 1 shows a flowchart illustrating a method for fracture characterization in unconventional formations in accordance with one embodiment of the present invention.

While the present invention is susceptible to various modifications and alternative forms, specific exemplary embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

The present invention relates generally to methods and systems for fracture characterization of unconventional formations. More particularly, but not by way of limitation, embodiments of the present invention include methods and systems for fracture characterization of unconventional formations based on limited vertical well log data.

Methods and systems are provided for deriving fracture parameters from common vertical well log data. Synthetic seismic fracture responses, or anisotropic synthetic seismograms, may be generated based on the derived fracture parameters. The synthetic seismic fracture responses or anisotropic synthetic seismograms may then be used to derive optimum seismic data acquisition geometry for fracture characterization. These methods of determining the seismic data acquisition geometry are advantageous over conventional methods in that these methods are more reliable and cheaper than many existing empirical methods, particularly as applied to fractured unconventional formations. Moreover, the methods disclosed herein allow the fracture parameters to be derived from limited but common well log data. Certain embodiments additionally contemplate determining the presence of gas filled fractures. These characterizations and evaluations of unconventional formations are useful for, among other things, determining optimal producing intervals and optimal drilling locations.

Other optional variations and enhancements are described further below.

Advantages of the methods disclosed herein include, but are not limited to, deriving P and S-wave anisotropy parameters from cross dipole sonic data, helping to generate synthetic fracture responses, and gas filled fracture identification for unconventional reservoirs with unidirectional fracture strikes. These methods can eliminate the use of costly image logs and core data. These methods ultimately translate to more efficient seismic imaging and more optimal hydrocarbon production. The methods disclosed herein are particularly advantageous in unconventional formations such as tight gas sand reservoirs or tight gas shale reservoirs where the formation is transversely isotropic with vertical and horizontal symmetry axis (VTI and HTI mediums respectively).

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the invention.

Synthetic seismograms are the result of one of many forms of forward modeling to predict the seismic response of the Earth. A synthetic seismogram is a direct model of acoustic energy traveling through the layers of the Earth. A synthetic seismogram helps to provide well-tie, forward model building for inverse problem and anisotropic parameter estimation. The methods herein contemplate deriving Thomsen parameters from a vertical well log where only some limited, basic data is available (e.g. some sonic logs and a density log). Thomsen parameters can be used to generate anisotropic synthetic seismograms.

A vertically fractured reservoir represents a transversely isotropic medium with horizontal axis of symmetry (HTI medium). Five anisotropic Thomsen parameters are required to completely define an HTI medium. Derivation of these five parameters from typical vertical well log data (containing P-wave velocity $V_P$, fast (S1) and slow (S2) S-wave velocities $V_{S1}$ and $V_{S2}$, and density) is considered difficult and therefore several assumptions are made and empirical relations are used to derive these parameters.

A method to derive Thomsen parameters from a vertical well log when only some basic data are available (i.e. vertical $V_P, V_{S1}, V_{S2}$, and density) is presented here. This method may be applicable for HTI mediums. Further, it may be extended for VTI mediums when horizontal logs are available. The proposed methods do not require borehole image data or core analysis data. Additionally, the methods are easy to implement. The only assumption in this method is that the vertical P-wave and S-wave velocities are equal to the background isotropic P-wave and S-wave velocities. An example of deriving Thomsen parameters and other fracture parameters using a vertical well log data from Basin X in the Midwestern United States is presented the Examples section below. In this basin, the reservoir is tight sand and the natural fractures are vertical and have one dominant strike direction. Based on these observations, tight sand reservoir can be considered as an HTI medium. Implementing the proposed method, five rotated Thomsen parameters are derived from the limited well log data. Fracture density values in the reservoir level are also obtained as a byproduct of this method. Further investigation detects the presence of gas filled fractures.

Vertical well log data set for this method contains $V_P, V_{S1}, V_{S2}$, and density data from the fractured reservoir. The medium is considered HTI and the fractures contain either water or gas. With these assumptions all the Thomsen parameters are derived from the well log data along with the fracture density. Presence of gas filled fractures is also identified. Fast and slow S-wave velocities ($V_{S1}$ and $V_{S2}$) in an HTI medium may be written as:

$$\rho V^2_{s1} = C_{44}, \qquad [\text{Eqn. 1}]$$

and $$\rho V^2_{s2} = C_{66}, \qquad [\text{Eqn. 2}]$$

Here $\rho$ is the density of the background isotropic medium of the effective HTI medium and $C_{ij}$ denote the stiffness matrix elements of the HTI medium. Now from the definition of the Thomsen parameter $\gamma$ one can write:

$$\gamma = \frac{V_{s2}^2 - V_{s1}^2}{2V_{s1}^2}. \qquad [\text{Eqn. 3}]$$

The same Thomsen parameter γ may also be written in terms of tangential fracture compliance $Z_T$ as:

$$\gamma = \frac{1}{2}\mu Z_T, \qquad [\text{Eqn. 4}]$$

where μ is the shear modulus of the background isotropic medium and can be derived from the vertical density and shear wave logs (equation 1), as for an HTI medium:

$$C_{44} = \mu \qquad [\text{Eqn. 5}]$$

Once the value of $Z_T$ is obtained, then one can write:

$$\frac{Z_N}{Z_T} = 1 - v/2, \qquad [\text{Eqn. 6}]$$

where $Z_N$ is the normal fracture compliance and ν is the background isotropic medium's Poisson's ratio. The parameter ν can be derived using the vertical P and S-wave velocity logs.

Obtaining background P-wave velocity requires the knowledge of the presence of water filled fractures in the reservoir. At those locations vertical P-wave velocity of the HTI medium is the same as the background isotropic P-wave velocity, as $Z_N$ becomes zero at those locations. However, for practical purpose one can consider vertical P-wave velocity to be equal to the background P-wave velocity as normal fracture weakness ($\delta_N$) values are relatively small (defined later).

Once the $Z_N$, $Z_T$, values and background P-wave, S-wave velocities, and density are known, then the compliance matrix for the HTI medium can be written as:

$$s = \begin{bmatrix} \frac{\lambda+\mu}{\mu(3\lambda+2\mu)}+Z_N & -\frac{\lambda}{2\mu(3\lambda+2\mu)} & -\frac{\lambda}{2\mu(3\lambda+2\mu)} & 0 & 0 & 0 \\ -\frac{\lambda}{2\mu(3\lambda+2\mu)} & \frac{\lambda+\mu}{\mu(3\lambda+2\mu)} & -\frac{\lambda}{2\mu(3\lambda+2\mu)} & 0 & 0 & 0 \\ -\frac{\lambda}{2\mu(3\lambda+2\mu)} & -\frac{\lambda}{2\mu(3\lambda+2\mu)} & \frac{\lambda+\mu}{\mu(3\lambda+2\mu)} & 0 & 0 & 0 \\ 0 & 0 & 0 & \frac{1}{\mu} & 0 & 0 \\ 0 & 0 & 0 & 0 & \frac{1}{\mu}+Z_T & 0 \\ 0 & 0 & 0 & 0 & 0 & \frac{1}{\mu}+Z_T \end{bmatrix}. \qquad [\text{Eqn. 7}]$$

In equation 7, λ is the Lame's parameter and can be determined using background P-wave, S-wave velocities, and density. After evaluating equation 7, a simple matrix inversion can provide the stiffness matrix ($C_{ij}$) for the HTI medium. Therefore, it can be written:

$$C_{ij} = (S_{ij})^{-1}. \qquad [\text{Eqn. 8}]$$

Once $C_{ij}$ values are known, other Thomsen parameters ϵ and δ can be derived using the following equations:

$$\varepsilon = \frac{C_{11} - C_{33}}{2C_{33}}, \qquad [\text{Eqn. 9}]$$

and $$\delta = \frac{(C_{13} + C_{55})^2 - (C_{33} - C_{55})^2}{2C_{33}(C_{33} - C_{55})}. \qquad [\text{Eqn. 10}]$$

Therefore all the anisotropic Thomsen parameters are derived from the well log. Additionally, fracture density can be derived using the following equations:

$$\delta_N = \frac{(\lambda + 2\mu)Z_N}{1 + (\lambda + 2\mu)Z_N}, \qquad [\text{Eqn. 11}]$$

and $$\delta_N = \frac{16e}{3(3 - 2g)}. \qquad [\text{Eqn. 12}]$$

Here, e is the fracture density, g is the square of vertical $V_P$, $V_S$ ratio, and $\delta_N$ is the normal fracture weakness (introduced earlier).

FIG. 1 shows a flowchart illustrating a method for fracture characterization in unconventional formations in accordance with one embodiment of the present invention.

Method 100 commences with step 110. In step 110, a plurality of well logs are received or otherwise obtained. In this example, certain sonic logs as a function of depth are obtained, namely vertical P-wave velocities ($V_P$), a vertical fast S-wave velocities ($V_{S1}$), and a vertical slow S-wave velocities ($V_{S2}$). In some cases, one may run well logs to obtain this data, or alternatively, this well log data may be simply obtained from another.

In step 120, seismic fracture parameters are determined based on the well log data obtained in step 110. These fracture parameters determined may include an S-wave anisotropy (γ), a P-wave anisotropy (ϵ), and a move-out anisotropy (δ).

The S-wave anisotropy (γ) may be generated based on equation 3 described above (or mathematical equivalent thereof) using the sonic values obtained in step 110. The P-wave anisotropy (ϵ) may be obtained based on equations 7 and 9 (or mathematical equivalents thereof) as described above. The move-out anisotropy (δ) may be obtained based on equation 10 (or mathematical equivalent thereof).

In step 130, synthetic seismic fracture responses or anisotropic synthetic seismograms may be generated based on the seismic fracture parameters obtained in step 120. Examples of methods for generating seismic fracture parameters include, for example, accurate finite difference methods, reflectivity methods, ray tracing methods, approximate convolution method, or any combination thereof.

In step 140, a seismic data acquisition geometry may be derived from the synthetic seismic fracture responses determined in step 130. An optimum offset azimuth distribution may be calculated from the anisotropic synthetic seismogram for which fracture responses can be prominent and easy to identify. The seismic data acquisition geometry may optionally be used to optimally physically arrange a plurality of seismic receivers and at least one seismic source based on the seismic data acquisition geometry for real data acquisition.

In optional step 150, gas filled fractures may be identified as a function of depth. To identify gas filled fractures as a function of wellbore depth (i), one may determine a ratio of a normal fracture compliance ($Z_{N,i}$) to a tangential fracture compliance ($Z_{T,i}$) based on the vertical P-wave velocity $V_{P,i}$, the vertical fast S-wave velocity ($V_{S1,i}$), the vertical slow S-wave velocity ($V_{S2,i}$) and the density ($\rho_i$). As described in more detail above, the ratio $Z_{N,i}/Z_{T,i}$ may be determined by the relationship $1-v_i/2$, wherein $v_i$ is Poisson's ratio of the formation at each wellbore depth i, wherein $v_i$ is derived from the vertical P-wave velocity $V_{P,i}$, the vertical fast S-wave velocity ($V_{S1,i}$), the vertical slow S-wave velocity ($V_{S2,i}$) and the density ($\rho_i$) as $v_i = \lambda_i/2(\lambda_i+\mu_i)$. $\mu_i$ can be derived using $V_{s1i}$ and $\rho_i$ (using Eqn 1 and 5) and $\lambda_i$ may be derived from P-wave velocity log as $V_{Pi}^2 = (\lambda_i + 2\mu_i)/\rho_i$.

A gas filled fracture presence indicator may be determined based on the determinations in step 150, namely the ratio $Z_{N,i}/Z_{T,i}$ and the porosity ($\phi_i$). Gas filled fractures are indicated at a well depth i where the ratio $Z_{N,i}/Z_{T,i}$ is above a first threshold and the porosity ($\phi_i$) is below a second threshold. Suitable values of the first threshold and second threshold that result in reliable predictions of gas filled fractures include, but are not limited to, a first threshold of about 0.85 and a second threshold below the fracture porosity of the formation at each wellbore depth. Other values that may be used for the first threshold include any value between about 0.85 to about 1 and any value between about 0.95 to about 1.

In optional step 160, an operator may produce hydrocarbons from intervals of the wellbore having gas-filled fractures as identified in step 150.

In step 170, any of the above determined results may be outputted to a user, including, but not limited to, the seismic fracture parameters, the synthetic seismic responses, the seismic data acquisition geometry, and the gas-filled presence indicator.

The methods described herein are particularly applicable to unconventional reservoirs and especially horizontally transverse isotropic (HTI) medium. In certain embodiments, the unconventional reservoir is a tight gas sand reservoir or a tight gas shale reservoir. Unlike many of the conventional methods, the methods described herein may be used where no image log is used to determine the plurality of fracture parameters.

It is recognized that any of the elements and features of each of the devices described herein are capable of use with any of the other devices described herein with no limitation. Furthermore, it is recognized that the steps of the methods herein may be performed in any order except unless explicitly stated otherwise or inherently required otherwise by the particular method.

To facilitate a better understanding of the present invention, the following examples of certain embodiments are given. In no way should the following examples be read to limit, or define, the scope of the invention.

EXAMPLE

An example of deriving Thomsen parameters and other fracture parameters using a vertical well log data from basin X in the Midwestern United States is presented here. In this basin the reservoir is tight sand and the natural fractures are vertical and have one dominant strike direction. Based on these observations, tight sand reservoir can be considered as an HTI medium. Implementing the proposed method, five rotated Thomsen parameters are derived from the limited well log data. Fracture density values in the reservoir level are also obtained as a byproduct of this method. Further investigation detects the presence of gas filled fractures. A plot of gas filled fractures is presented on the water saturation log. Presence of gas filled fractures also correlate nicely with the gamma ray log (to show the presence of the fractures in sand) and production data.

Basin X is located in the Midwestern United States and is one of the largest gas fields in the United States. In this area, a west to northwest trending regional maximum stress exists that helped to develop aligned vertical fractures at the reservoir level (Lorenz and Finley, 1991). Study area is located in the north side of the basin X. The reservoir is composed of tight sand with porosity of 1%-15%. A separate study (Lewallen et al. 2008) from this area shows presence of open vertical fractures with constant strike directions at the reservoir level. Based on this study, the reservoir here can be assumed an HTI medium with one dominant fracture direction.

Figure 4A:
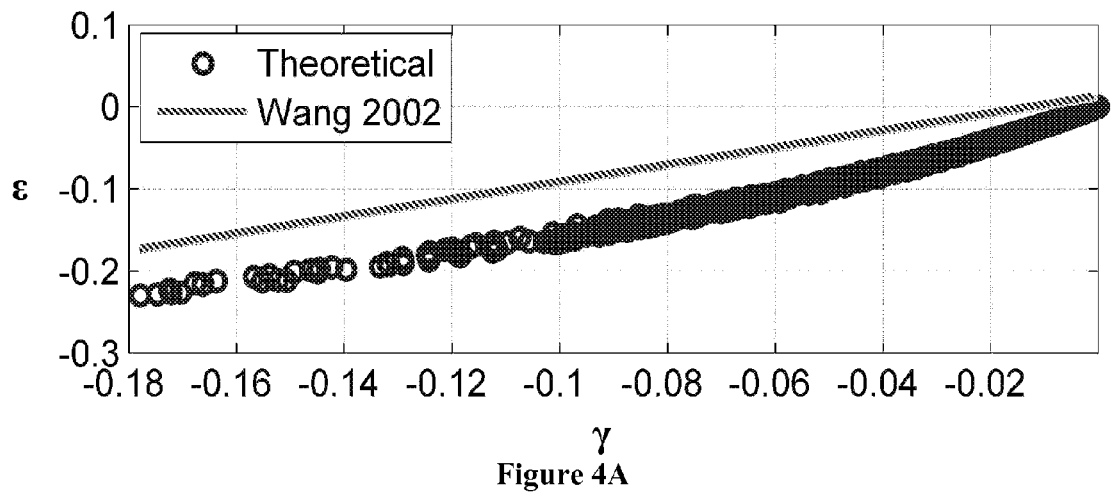
FIGS. 4A and 4B illustrate crossplots of derived Thomsen parameters in accordance with one embodiment of the present invention (theoretical, black circles) along with a comparison to theoretical predictions using Wang's 2002 empirical relation (gray lines)
Figure 4B:
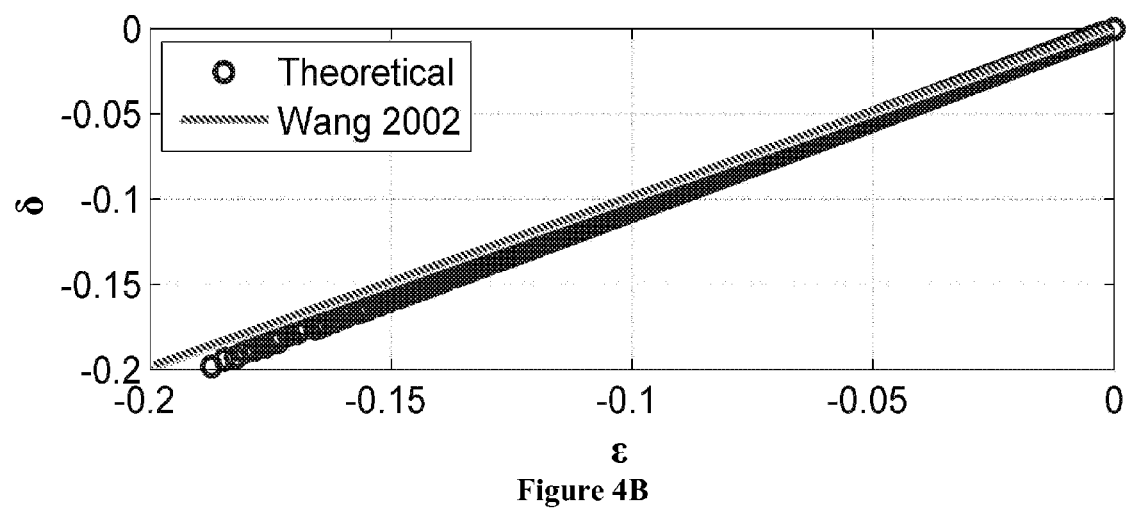

One vertical well data from this area is used in this method. Well log data contain $V_P$, $V_{S1}$, $V_{S2}$, density, porosity ($\phi$), and water saturation ($S_W$) data. FIG. 2 shows the vertical $V_P$, $V_{S1}$, $V_{S2}$, and density data used in this study. Then, using the methods described herein and equations 2-10, anisotropic Thomsen parameters $\gamma$, $\delta$, and $\epsilon$ are determined, the results of which are shown in FIG. 3. FIG. 4A shows a crossplot of Thomsen parameter $\gamma$ and $\epsilon$ derived from the equations described herein (black circles), whereas FIG. 4B shows a crossplot of $\epsilon$ and $\delta$ derived from the equations described herein (black circles). For comparison purposes, the gray lines on the both crossplots are shown between Thomsen parameters based on an empirical relation by Wang (2002). A little deviation is apparent in FIGS. 4A and 4B between empirical relationship and the theoretical results from the methods herein.

Figure 5:
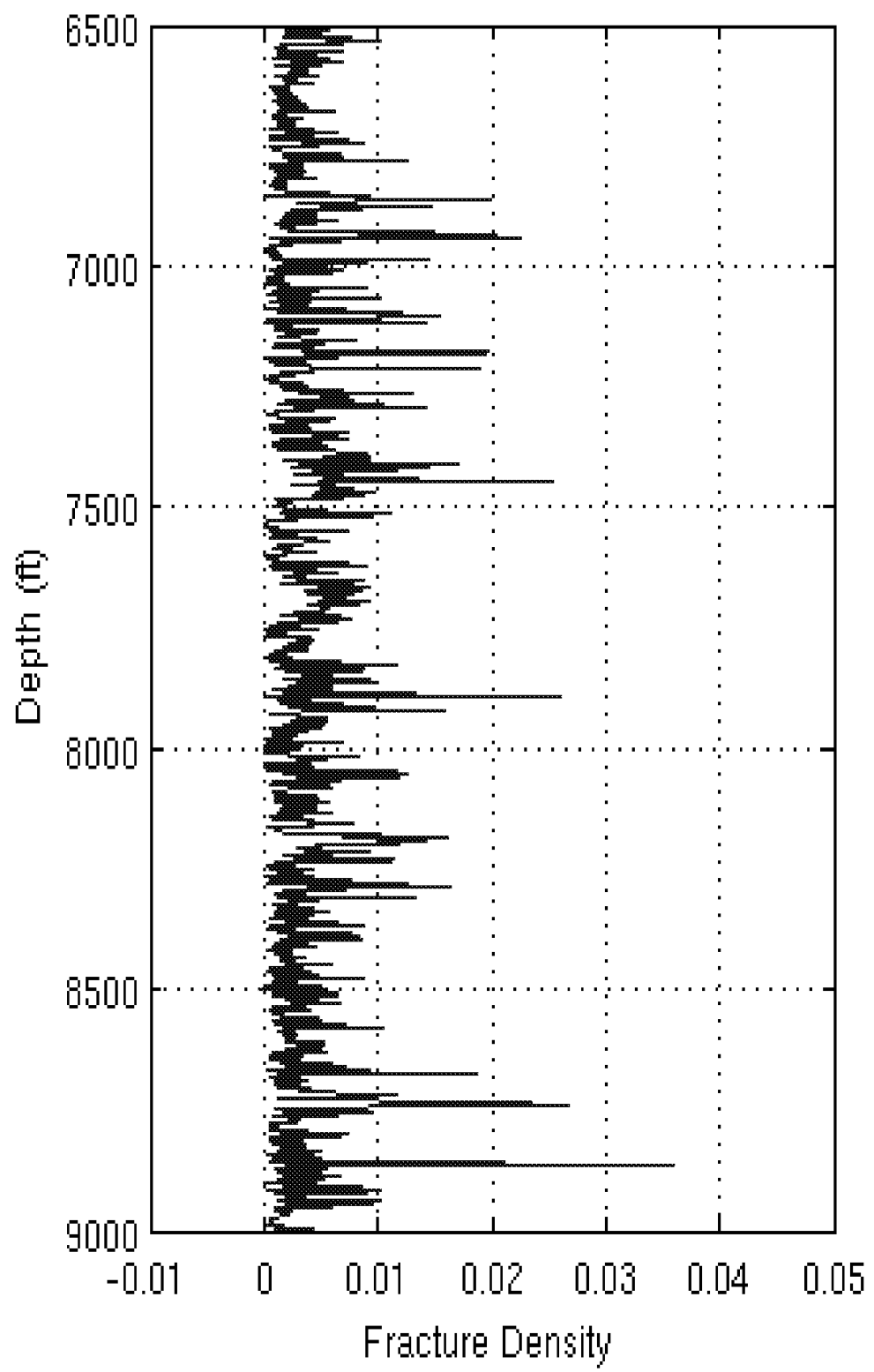
FIG. 5 illustrates a fracture density log prepared in accordance with one embodiment of the present invention.
Figure 6:
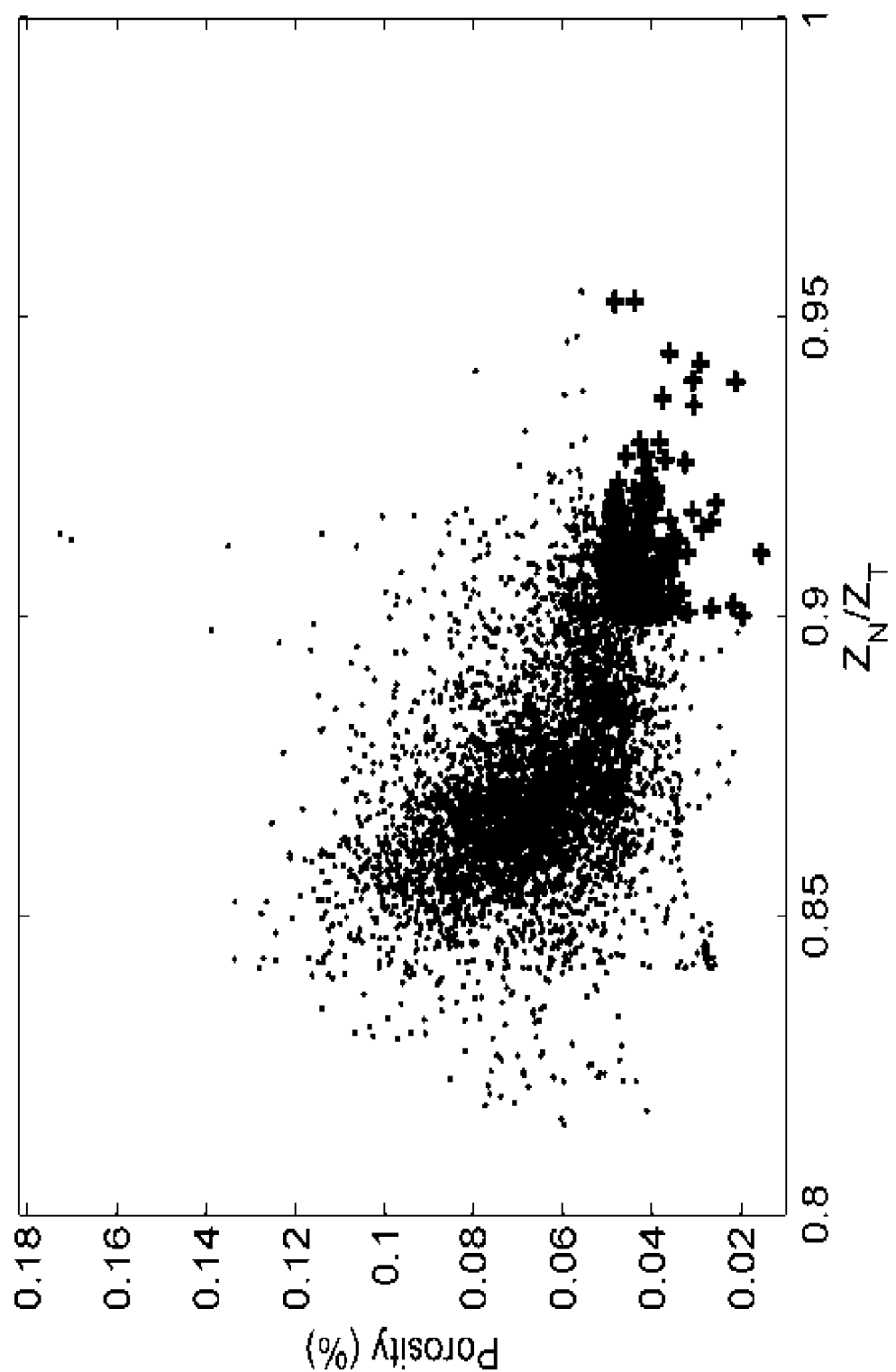
FIG. 6 illustrates a crossplot between $Z_n/Z_t$ and porosity for an entire well log in accordance with one embodiment of the present invention. Here, the plus signs denote the gas filled fractures.
Figure 7B:
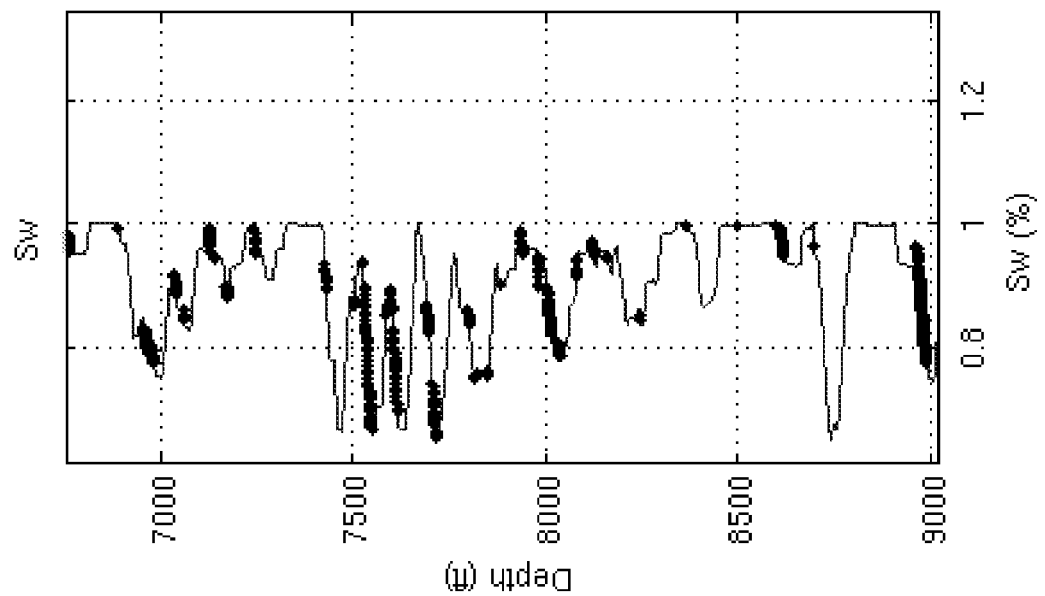
FIG. 7B illustrates gas filled fractures identified from the crossplots of FIGS. 6A and 6B plotted on a water saturation log.
Figure 7A:
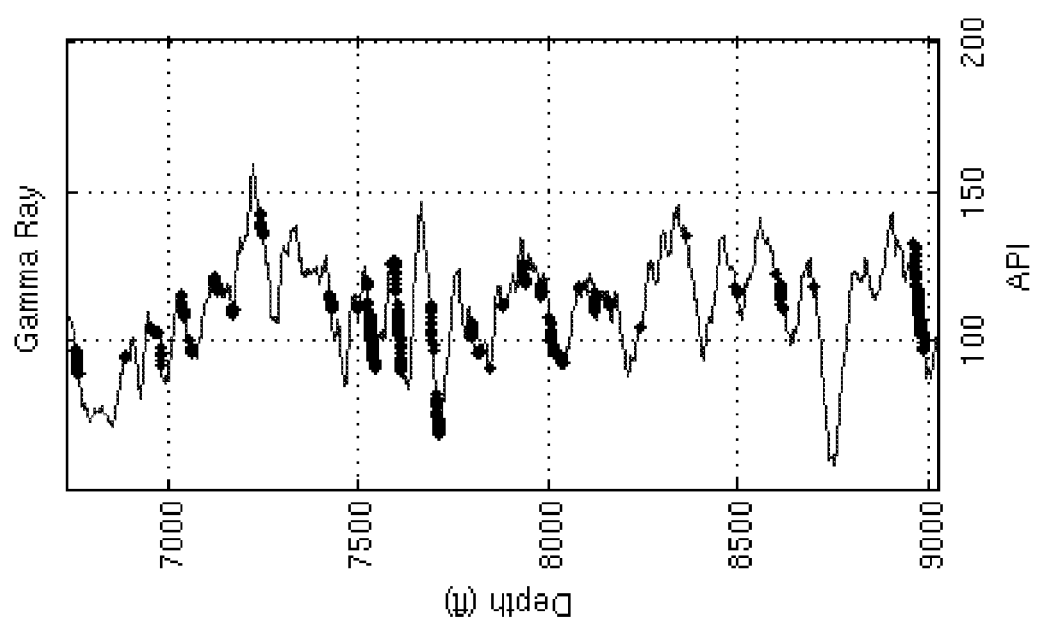
FIG. 7A illustrates gas filled fractures identified from the crossplots of FIGS. 6A and 6B plotted on a gamma ray log.
Figures 8A, 8B:
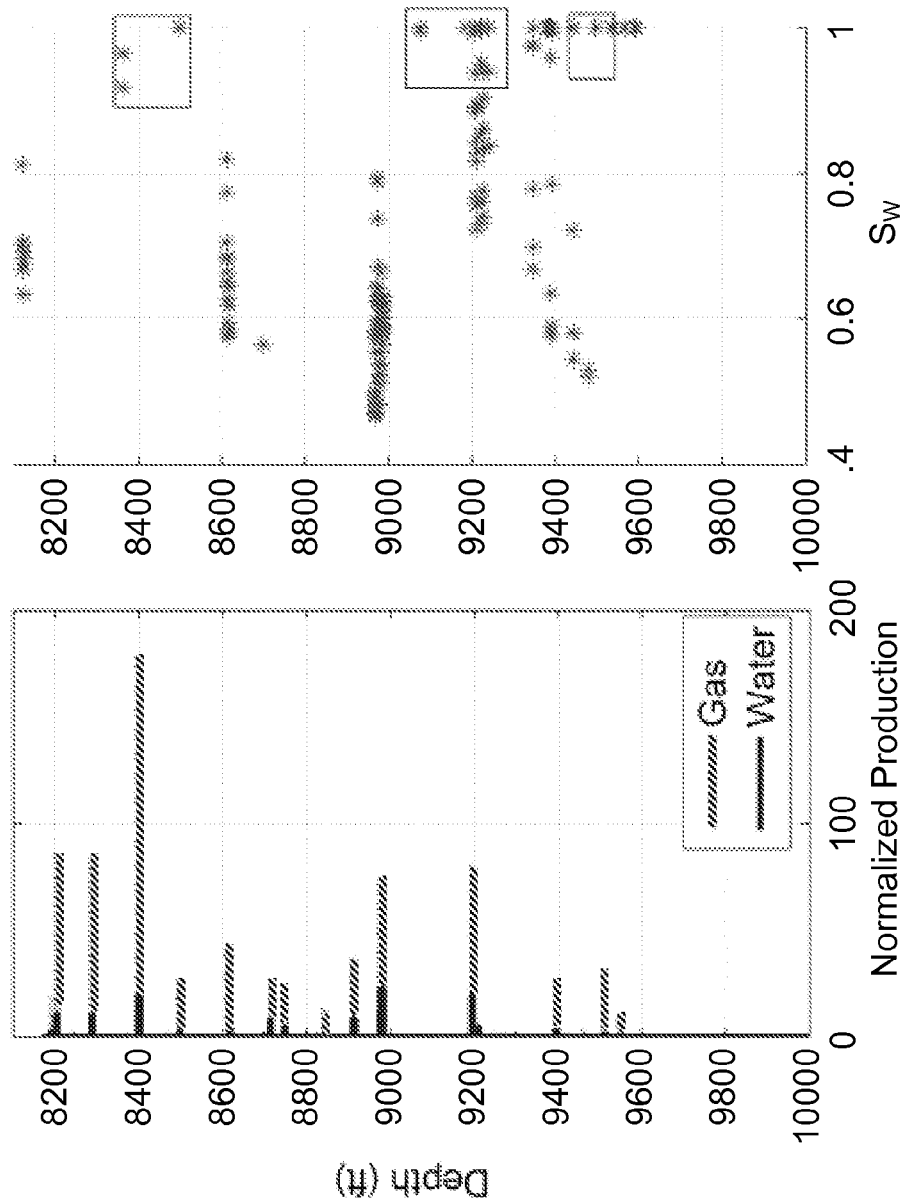

A fracture density log may be generated using equations 11 and 12. The log is shown in FIG. 5. As shown in FIG. 5, the density values are small and therefore good for the assumptions of the methods described herein. Subsequently, the gas filled fractures may be identified from the available data. For that identification, a crossplot of $Z_N/Z_T$ and effective porosity may be generated as shown in FIG. 6. For gas filled fractures, the value of $Z_N/Z_T$ is almost 1. Since fracture porosity in this field is very low (6%), using these constraints, gas filled fractures may be identified from the log as shown by plus sign in the lower right quadrant of FIG. 6 (that is, those points above a $Z_N/Z_T$ value of 0.9 and a porosity below 6%. These gas filled fracture points may be plotted on the gamma ray log and water saturation log (diamond points in FIG. 7A). It is evident that the gas filled fractures are present in the sand only (FIG. 7A), and they are at the positions where water saturation is low (FIG. 7B). There are very few deviations from this observation in FIGS. 7A and 7B. Except for a few points, identified gas filled fractures match the water saturation log quite well. To understand this mismatch, the results may be compared with the production data. In FIG. 8A, the production log (gas and water production flux) at the reservoir depth is plotted. FIG. 8B shows the water saturation values at the location where gas filled fractures have been identified. In FIG. 8B, areas of high water saturation values are marked with black boxes in locations where gas filled fractures.

Therefore, within these boxes, the methods predict the presence of gas filled fractures, whereas the saturation log is predicting presence of water. When these areas are compared with the production data, one can see that the production data supports presence of gas in this area. One explanation to this observation could be presence of gas filled fractures in a water saturated matrix. Nonetheless, good correlation between production data and derived gas filled fractures indicates the satisfactory identification of gas filled fractures using the methods described herein.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations and equivalents are considered within the scope and spirit of the present invention. Also, the terms in the claims have their plain, ordinary meaning unless otherwise explicitly and clearly defined by the patentee.

What is claimed is:

1. A method for fracture characterization in unconventional formations comprising the steps of:
    logging a well at a plurality of wellbore depths to obtain a plurality of well logs, the plurality of well logs comprising a vertical P-wave velocity log, a vertical fast S-wave velocity log, a vertical slow S-wave velocity log, and a density log;
    wherein the vertical P-wave velocity log comprises a plurality of vertical P-wave velocities ($V_P$) at the plurality of wellbore depths;
    wherein the vertical fast S-wave velocity log comprises a plurality of vertical fast S-wave velocities ($V_{S1}$) at the plurality of wellbore depths;
    wherein the vertical slow S-wave velocity log comprises a plurality of vertical slow S-wave velocities ($V_{S2}$) at the plurality of wellbore depths;
    wherein the density log comprises a plurality of densities ($\rho$) at the plurality of wellbore depths;
    determining a plurality of seismic fracture parameters at the plurality of wellbore depths based on the plurality of well logs, the seismic fracture parameters comprising an S-wave anisotropy ($\gamma$), a P-wave anisotropy ($\epsilon$), and a move-out anisotropy ($\delta$);
    wherein C is a stiffness matrix, and wherein $C_{ij}$ is an element from row i and column j of the stiffness matrix;
    wherein the S-wave anisotropy ($\gamma_i$) is determined at each well bore depth (i) according to the relationship $$\lambda_i = \frac{V_{S2,i}^2 - V_{S1,i}^2}{2V_{S1,i}^2}$$

or mathematical equivalent thereof;

wherein the P-wave anisotropy ($\epsilon_i$) is determined at each well bore depth (i) according to the relationship $$\varepsilon_i = \frac{C_{11,i} - C_{33,i}}{2C_{33,i}}$$

or mathematical equivalent thereof;
    wherein the move-out anisotropy ($\delta_i$) is determined at each well bore depth (i) according to the relationship $$\delta_i = \frac{(C_{13,i} + C_{55,i})^2 - (C_{33,i} + C_{55,i})^2}{2C_{33,i}(C_{33,i} - C_{55,i})}$$

or mathematical equivalent thereof;
    generating synthetic seismic fracture responses based on the seismic fracture parameters; and
    deriving a seismic data acquisition geometry based on the synthetic seismic fracture responses.

2. The method of claim 1 further comprising the step of physically arranging a plurality of seismic receivers and at least one seismic source based on the seismic data acquisition geometry.

3. The method of claim 1 further comprising the steps of:
    (a) determining the presence of gas filled fractures at each depth; and
    (b) producing from the intervals with gas filled fractures.

4. The method of claim 3 wherein step (a) further comprises determining, at each wellbore depth (i), the ratio of a normal fracture compliance ($Z_{N,i}$) to a tangential fracture compliance ($Z_{T,i}$) based on the vertical P-wave velocity $V_{P,i}$, the vertical fast S-wave velocity ($V_{S1,i}$), the vertical slow S-wave velocity ($V_{S2,i}$) and the density ($\rho_i$);
    wherein the ratio $Z_{N,i}/Z_{T,i}$ is characterized by the relationship $1-v_i/2$, wherein $v_i$ is Poisson's ratio of the formation at each wellbore depth i and wherein $v_i$ is derived from the vertical P-wave velocity $V_{P,i}$, the vertical fast S-wave velocity ($V_{S1,i}$), the vertical slow S-wave velocity ($V_{S2,i}$) and the density ($\rho_i$); and
    outputting to a user a gas filled fracture presence indicator for both (i) any ratio $Z_{N,i}/Z_{T,i}$ above a first threshold and (ii) for any porosity ($\phi_i$) below a second threshold.

5. The method of claim 4 wherein the first threshold is between about 0.85 and about 1.

6. The method of claim 5 wherein the first threshold is between about 0.95 and about 1.

7. The method of claim 3 wherein the second threshold is below the fracture porosity of the formation at each wellbore depth.

8. The method of claim 1 wherein the unconventional reservoir is a horizontally transverse isotropic (HTI) medium.

9. The method of claim 1 wherein the unconventional reservoir is a tight gas sand reservoir or a tight gas sand reservoir.

10. The method of claim 4 wherein the step of outputting further comprises displaying the gas filled fracture presence indicator on a display.

11. The method of claim 1 wherein no image log is used to determine the plurality of fracture parameters.

12. The method of claim 7:
    wherein the unconventional reservoir is a horizontally transverse isotropic (HTI) medium;
    wherein the unconventional reservoir is a tight gas sand reservoir or a tight gas sand reservoir;

wherein the step of outputting further comprises displaying the gas filled fracture presence indicator on a display; and wherein no image log is used to determine the plurality of fracture parameters.

13. A method for fracture characterization in unconventional formations comprising the steps of:

receiving a plurality of vertical P-wave velocities ($V_P$) at the plurality of wellbore depths;

receiving a plurality of vertical fast S-wave velocities ($V_{S1}$) at the plurality of wellbore depths;

receiving a plurality of vertical slow S-wave velocities ($V_{S2}$) at the plurality of wellbore depths;

receiving a plurality of densities ($\rho$) at the plurality of wellbore depths;

determining a plurality of seismic fracture parameters at the plurality of wellbore depths based on the plurality of well logs, the seismic fracture parameters comprising an S-wave anisotropy ($\gamma$), a P-wave anisotropy ($\epsilon$), and a move-out anisotropy ($\delta$);

wherein C is a stiffness matrix, and wherein $C_{ij}$ is an element from row i and column j of the stiffness matrix;

wherein the S-wave anisotropy ($\gamma_i$) is determined at each well bore depth (i) according to the relationship $$\lambda_i = \frac{V_{S2,i}^2 - V_{S1,i}^2}{2V_{S1,i}^2}$$

or mathematical equivalent thereof;

wherein the P-wave anisotropy ($\epsilon_i$) is determined at each well bore depth (i) according to the relationship $$\epsilon_i = \frac{C_{11,i} - C_{33,i}}{2C_{33,i}}$$

or mathematical equivalent thereof;

wherein the move-out anisotropy ($\delta_i$) is determined at each well bore depth (i) according to the relationship $$\delta_i = \frac{(C_{13,i} + C_{55,i})^2 - (C_{33,i} + C_{55,i})^2}{2C_{33,i}(C_{33,i} - C_{55,i})}$$

or mathematical equivalent thereof;

generating synthetic seismic fracture responses based on the seismic fracture parameters;

deriving a seismic data acquisition geometry based on the synthetic seismic fracture responses; and arranging physically a plurality of seismic receivers and at least one seismic source based on the seismic data acquisition geometry.

14. The method of claim 13 further comprising the steps of:

(a) determining the presence of gas filled fractures at each depth; and (b) producing from the intervals with gas filled fractures.

15. The method of claim 14 wherein step (a) further comprises determining, at each wellbore depth (i), the ratio of a normal fracture compliance ($Z_{N,i}$) to a tangential fracture compliance ($Z_{T,i}$) based on the vertical P-wave velocity $V_{P,i}$, the vertical fast S-wave velocity ($V_{S1,i}$), the vertical slow S-wave velocity ($V_{S2,i}$) and the density ($\rho_i$);

wherein the ratio $Z_{N,i}/Z_{T,i}$ is characterized by the relationship $1-v_i/2$, wherein $v_i$ is Poisson's ratio of the formation at each wellbore depth i and wherein $v_i$ is derived from the vertical P-wave velocity $V_{P,i}$, the vertical fast S-wave velocity ($V_{S1,i}$), the vertical slow S-wave velocity ($V_{S2,i}$) and the density ($\rho_i$); and outputting to a user a gas filled fracture presence indicator for both (i) any ratio $Z_{N,i}/Z_{T,i}$ above a first threshold and (ii) for any porosity ($\phi_i$) below a second threshold.

16. The method of claim 15 wherein the first threshold is between about 0.85 and about 1.

17. The method of claim 16 wherein the first threshold is between about 0.95 and about 1.

18. The method of claim 15 wherein the second threshold is below the fracture porosity of the formation at each wellbore depth.

19. The method of claim 13 wherein the unconventional reservoir is a horizontally transverse isotropic (HTI) medium.

20. The method of claim 13 wherein the unconventional reservoir is a tight gas sand reservoir or a tight gas sand reservoir.

21. The method of claim 13 wherein the step of outputting further comprises displaying the gas filled fracture presence indicator on a display.

22. The method of claim 13 wherein no image log is used to determine the plurality of fracture parameters.

* * * * *